Nov. 22, 1938. C. A. HEILAND 2,137,963
GRAVIMETER
Filed Oct. 22, 1935   3 Sheets-Sheet 1
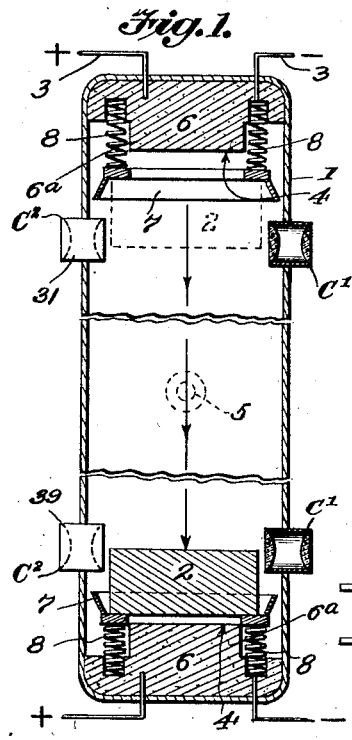
Inventor
C. A. HEILAND Nov. 22, 1938.    C. A. HEILAND    2,137,963
GRAVIMETER
Filed Oct. 22, 1935    3 Sheets-Sheet 2
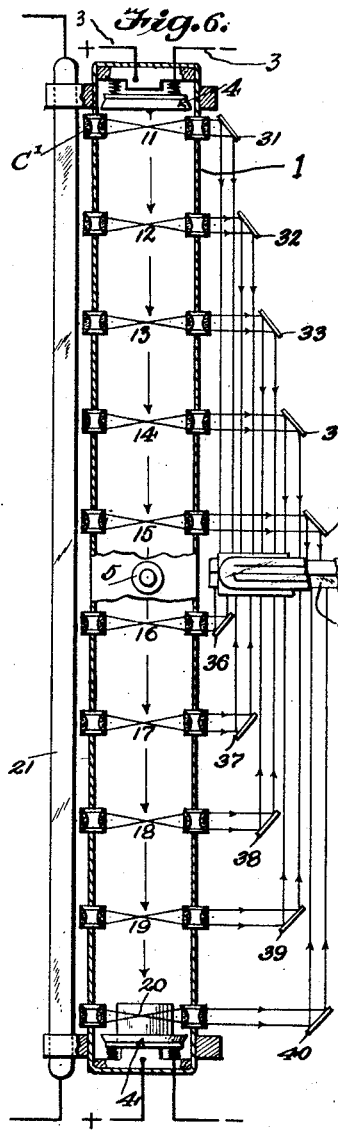
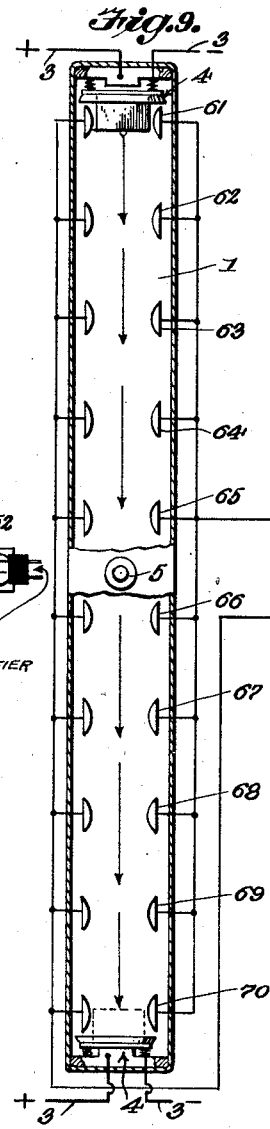
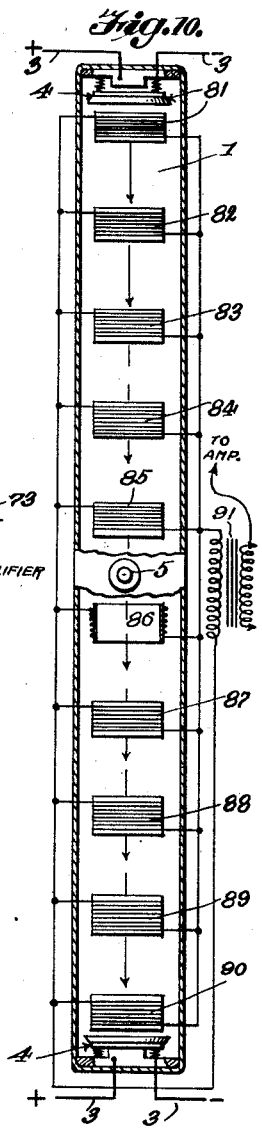
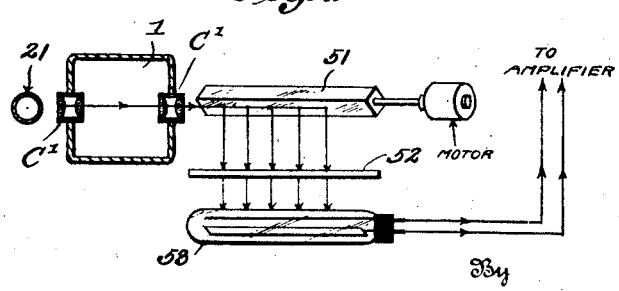
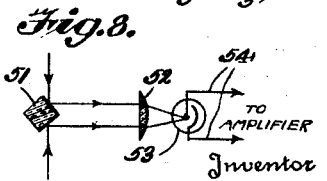
Inventor
C. A. HEILAND
By
Attorney Nov. 22, 1938.   C. A. HEILAND   2,137,963
GRAVIMETER
Filed Oct. 22, 1935   3 Sheets-Sheet 3
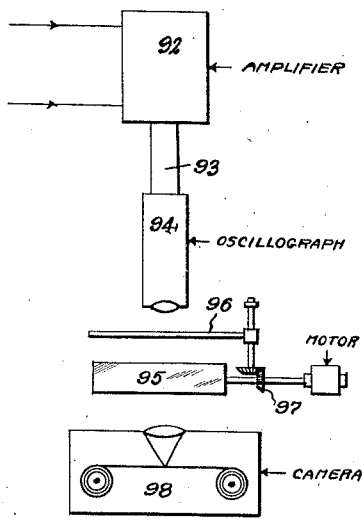
Fig. 11.
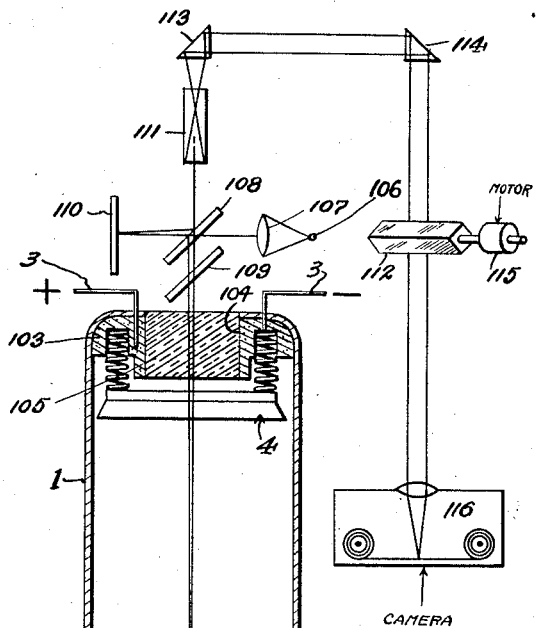
Fig. 13.
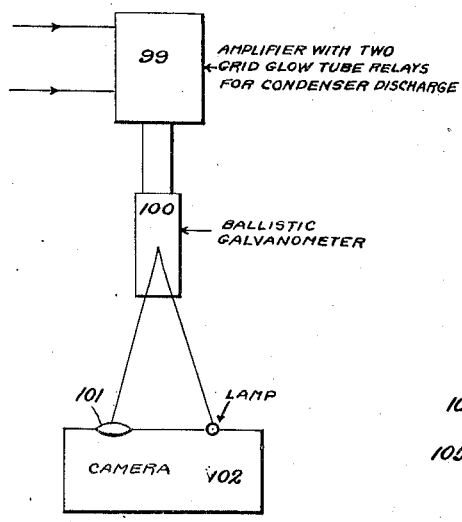
Fig. 12.
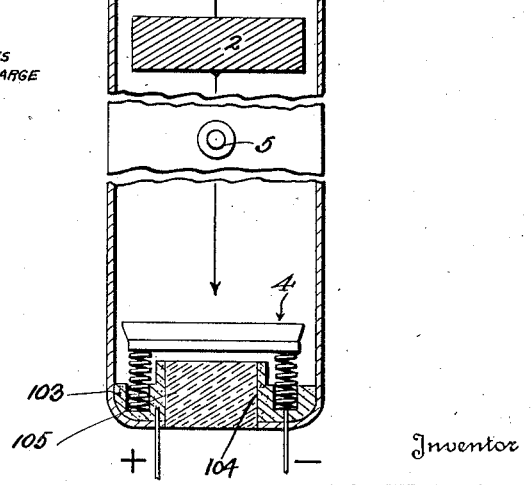
Inventor
C. A. HEILAND
By
Attorney Patented Nov. 22, 1938

2,137,963

UNITED STATES PATENT OFFICE 2,137,963

GRAVIMETER

Carl A. Heiland, Golden, Colo., assignor to Heiland Research Corporation, Denver, Colo., a corporation of Colorado Application October 22, 1935, Serial No. 46,189

10 Claims. (Cl. 265—1.4)

My invention relates broadly to systems of measurement and more particularly to an arrangement of measuring instrument for the precision determination of gravity and gravity gradient, in a vertical direction by falling bodies.

One object of my invention is to provide a system for observing the effects of gravity upon falling bodies with a high degree of precision.

Still another object of my invention is to provide an instrument for observing the free fall of a mass and making a permanent record of such observations for subsequent reference, analysis, and research.

A further object of my invention is to provide a measuring instrument by which the free fall of a body through space may be photographed and the photographic record subsequently reproduced for an analysis of the action of the falling body through space.

A still further object of my invention is to provide measuring apparatus employing photoelectric means for recording the travel of a falling body through space for subsequent review and analysis.

Still another object of my invention is to provide a construction of instrumentality for measuring the fall of a body through space in which electromagnetic means are disposed at spaced intervals along the path of travel of the falling body, and are successively acted upon by the falling body to register through electromagnetic excitation of the recording instrument the characteristics of fall of the body for subsequent review and analysis.

A further object of my invention is to provide a circuit arrangement for controlling a cathode ray oscillograph in accordance with the fall of a body through space for recording the characteristics of fall of the body.

A still further object of my invention is to provide an apparatus for determining the interval travelled by a falling body in a given time interval or intervals, and accurately recording such fall with comparative markings on a film for subsequent reference and review.

Other and further objects of my invention reside in the provision of an instrument that may be used in the interferometric measuring of the travel of a moving body, as will be set forth more fully in the specification hereinafter following, by reference to the accompanying drawings, in which:

Figure 1 schematically illustrates one embodiment of my invention; Fig. 2 shows a photographic recording system embodying my invention; Fig. 3 schematically shows the manner of directing light rays in the system of Fig. 2 upon the recording camera; Fig. 4 shows a specimen of the film record reproduced in the camera of Fig. 3; Fig. 5 illustrates the construction of shutter mechanism employed in the system of Fig. 2; Fig. 6 schematically shows a measuring system employing my invention in which a photoelectric cell recording arrangement is utilized; Fig. 7 shows the manner of directing the light rays in the recording system of Fig. 6; Fig. 8 is an elementary optical diagram of the arrangement employed in the apparatus of Fig. 6; Fig. 9 shows a system of capacitive recording arranged for use in the measuring instrument of my invention; Fig. 10 shows a system of electromagnetic recording embodying my invention; Fig. 11 illustrates one arrangement I employ for recording the electrical impulses delivered by the instruments illustrated in Figs. 6–10; Fig. 12 illustrates an arrangement of apparatus for timing the electrical impulses generated by a falling body; and Fig. 13 illustrates the arrangement of apparatus employed for measuring the traveled path for any constant or variable time interval according to an interferometric method.

In the development of gravity measuring instruments, the constant trend during the past years has been to improve upon the speed of observation. Government and private agencies alike have been active in this development. Government agencies are interested in the distribution of gravity on continents and oceans as a scientific problem. Commercial enterprises utilize gravity data in search for regional and local geologic structure favorable for the accumulation of oil and gas.

For observations of relative gravity, pendulums have long been and are still in use, both in Government and commercial work. Their accuracy has been improved upon materially by the introduction of radio transmission of time signals and the use of the photoelectric cell for converting the light impulses of an oscillating pendulum into electrical impulses. A further improvement has been the use of two and three pendulums on the same support with parallel planes of oscillation, that is, a means by which horizontal accelerations can be minimized to such extent in their effect upon the pendulum, that gravity observation on submarines and other sea going vessels has become possible.

Simultaneously with the development of dynamic gravimeters (pendulums) has been the perfection of static gravimeters. In static gravimeters the force of gravity is compared with another force (spring force, in the "Hartley" gravity balance, or air of constant pressure and temperature, in "Haalck's" gravimeter). It is obvious that with static gravimeters a solution of the problem of greater speed of observation would be possible were it not for the fact that the comparison forces mentioned above cannot be kept constant enough and thus accuracy must be sacrificed to speed.

My invention is directed to means for effecting extremely rapid observation of gravity which have not been known heretofore. By use of the apparatus of my invention a high degree of accuracy is obtained in the making of observations. My invention utilizes the free fall of a heavy body for the determination of gravity. An added advantage is obtained as in all arrangements described below, not only absolute gravity but also its vertical gradient may be deduced from the measurements.

For the determination of gravity gradients, there is another instrument in wide use at this time. It is the Eötvös Torsion Balance" which is intended for the determination of local gravity anomalies. It measures the horizontal gradients of the horizontal and vertical gravity components. If these components be $$\frac{du}{dx}, \frac{du}{dy}, \text{ and } \frac{du}{dz},$$

the torsion balance measures the second derivatives $$\frac{d^2u}{dxdz}, \frac{d^2u}{dydz}, \frac{d^2u}{dxdy} = \frac{d^2u}{dydx} \text{ and } \frac{d^2u}{dy^2} - \frac{d^2u}{dx^2},$$

which may be reduced to $$\frac{d^2u}{dxdz} \text{ and } -\frac{d^2u}{dx^2}$$

for certain arrangements of instrument to certain simply disposed (two dimensional) subterranean masses. If such determination was known, gravity interpretation methods would be much more complete, as then all quantities related to the potential field are known, and "Laplace's" equation may be then set up in complete form.

In describing my invention, for simplification, reference is made to the derivation of gravity from fall observations, and it should be distinctly understood, that in all cases where more than two points of observation are arranged in a vertical direction, the vertical gravity gradient follows automatically from the results of observation.

Referring to the drawings in detail, the instrument of my invention consists of a tube indicated by reference character 1, in which the body indicated at 2, whose vertical travel and path is measured, is allowed to fall. The tube 1 may be of round, but is generally of square section into which the special observation or recording devices described later on are cemented. Virtually all air is permanently removed from the tube as to eliminate any interference from the viscosity of the air traversed by the falling body. Sealed in the tube 1 is a device 4 for releasing the fall of the body 2 and for catching it on the other side. It is operated electrically from a voltage source outside the tube connected to leads designated at 3 at each end of the tube. There are two such devices 4, one in the top and the other on the bottom of the tube, and their function is to not only release but also to catch the falling body 2. Once the body 2 has reached its lower position, the tube may be reversed by turning it about a central pivot, indicated in dotted lines in Fig. 1 at 5 and shown in full lines in Fig. 2, which places the body 2 in a position where it may be released for another set of observations. The releasing device 4 operates on the principle of capacitive attraction of a metal, that is, the fall body 2 and a semi-conductor 6, such as agate, lithographic stone, etc., when a potential difference is applied through circuit 3 to both the metal fall body 2 and the semi-conductor 6 when in contact. The agate block 6 is fastened to the ends of the tube 1. The block 6 has an annular shoulder 6a over which fits a metal ring 7, which, after the release of the body 2 of the device 4 at the top of the tube and before the ring 7 is struck by the body 2 of the device 4 at the bottom of the tube, is held away from the agate shoulder 6a by a set of springs 8. The metal ring 7 has a frusto-conical section as shown so as to facilitate the catching of the falling body 2. A high voltage external source is connected to both the ring 7 and the agate block 6 through leads 3.

The springs 8 are so dimensioned that the impact of the falling body 2 is just broken when it comes in contact with the agate 6. Then the electrical attraction takes effect and holds the body 2 firmly against the agate block 6. This pull is strong enough as to also overcome the pull of gravity when the tube is rotated about pivot 5 to bring the fallen body 2 into its upper position. The body 2 may then be released at will by opening the high voltage circuit 3 to the tube.

The electrostatic releasing device 4 here described, although one operating without inertia, is but one form of my invention. A mechanical or electromagnetic releasing device may also be employed.

The interior of the tube 1 is maintained at an even temperature and a correction for variations in temperature must be applied. It is most convenient to heat the tube electrically and to keep it as constant as possible by electrical temperature control devices of well known design. The tube must also be protected from heat transfer by radiation. For purposes of correction the temperature must be determined with an accuracy of $\frac{1}{100}$ of a degree centigrade as set forth hereinafter. With gravimeters, heretofore known the accuracy is of the order of ±2 milligals, and the time required for each observation from two hours to one-half hour. It is evident that the fall gravimeter of my invention offers a tremendous advantage, as the observed phenomenon happens with extreme rapidity, shortening the time necessary to make an observation and rendering it possible to make several repeat observations and measuring their results in the time heretofore necessary to make a single observation.

If $g$ is the force of gravity referred to the center of the measuring arrangement the space traversed by the falling body is $s = \frac{1}{2}gt^2$.

Thus, for a suitable field instrument, it will be convenient to make the fall path about 125 centimeters long and the fall time about one-half second.

The requirements of an instrument of the type described are such that a variation in the gravity force $g$ may be measured by measuring variations of time required by the body to traverse a given space or the space traversed in a given time. With the advantage gained by my invention over all previous gravimeters through the exceedingly short observation interval, it would seem ample for all practical purposes to double the accuracy of the present gravimeters, i. e., to make the middle error ±1 milligal. This would mean then, that the spacing of the observation points (see Figs. 2 and 3) along the path of the falling body has to remain constant to one part in one million. Using "Invar" for supporting the observation points, its temperature has to be kept constant to, or be corrected with an accuracy of 1/100 of a degree centigrade which is quite within the present possibilities of temperature control and observation.

The time accuracy has to be of the order of $3 \times 10^{-7}$ seconds. This is not out of the ordinary for gravity work as the same accuracy is required in pendulum observations if a middle error of about 1-2 milligals is desired. The rotating mirror method of observation as described below and shown in Figs. 2 and 3, gives an accuracy of the order of $10^{-8}$ seconds. The cathode ray oscillograph as used with the arrangements of Fig. 3 furnishes an accuracy of several microseconds; in conjunction with a revolving mirror, however, this may be increased by one or two decimal points.

If the gravity itself is measured with these accuracies, they are also sufficient for the measurement of the vertical gravity gradient for all practical purposes.

There are two distinctly different procedures of measurements which may be used alternately or in combination with the fall gravimeter. They are based upon the fact that there are two variables in the equation given above for determining gravity from fall observations: (1) space (or path), and (2) time of fall. Hence, arrangements are possible where the path or each subsequent portion thereof, is kept constant, and the time is measured which the falling body takes to traverse the path or each portion (a plurality of intervals provided by dividing the path into portions gives an increase in accuracy as well as measurements of the vertical gravity gradient). Secondly, in other arrangements, the fall distance or distances which are traversed by the falling body in certain units of time are accurately measured. Thirdly, the two arrangements may be combined so that any amount of change in path may be determined for any change in time. Particularly, the arrangements mentioned under (2), where fall space is the prime object of measurement, lend themselves well to such combination inasmuch as time markings are available in any case, for any of the measuring arrangements.

In the first type of measuring arrangements, the time required to pass certain intervals may be observed (1) by direct photography; (2) oscillographically by the use of (a) photoelectric cells; (b) by capacitive; and (c) by electromagnetic recording.

For the second and third type of measurements, namely, those involving the measurements of intervals traversed in certain units of time, practically all arrangements of the first type just described are applicable inasmuch as they not only permit of calculating the time of passage through the midpoint of any observation point, but also the rate of approach and departure, to and from it. However, there is one arrangement that is particularly well adapted for this purpose, and that is the interferometer method, by means of which the exact path of the falling body may be correctly measured.

Fig. 2 illustrates one form of my invention employing a direct photographic method in which the object is photographed as it passes a plurality of observation points 11, 12, 13, 14, 15, 16, 17, 18, 19, and 20 in the fall tube 1. Each observation point is provided with condenser lenses $C_1$, well cemented into the tubing 1, admitting the light of a longitudinally disposed gas filled tube 21 at each observation station. The gas filled tube 21 is lighted intermittently from an oscillator 22 connected to the tube 21 through transformer 23. I may employ any kind of an electrical oscillator furnishing sufficient output to illuminate the tube 21. The oscillator may be an alternating current generator, or 60 cycle current from the regular power supply mains can be utilized. The condenser lenses $C_1$ focus the light from tube 21 on the path which the falling body 2 is taking. The light is then picked up by the second system of condenser lenses $C_2$ at each observation point and made parallel. In front of each of the condenser lenses $C_2$ is a prism or mirror indicated at 31, 32, 33, 34, 35, 36, 37, 38, 39, and 40, which throws the light down to a revolving mirror 41, driven by a synchronous motor 42. As heretofore pointed out the tube 1 may be turned about central pivot 5 between sets of observations. Thus five traces of light will be thrown upon the revolving mirror 41 when ten observation points are provided as shown in Fig. 2, five from above and five from below. This arrangement has been provided simply for symmetry of construction as it would be equally feasible to have the revolving mirror 41 at the bottom and have ten traces projected on it, all from above.

The purpose of the revolving mirror 41 is to provide for a more intelligible recording by the camera in respect to the times of passages of the falling body. When the mirror 41 is in position to reflect a beam of light from one of the optical systems to the camera in a horizontal direction, the beam strikes the recording surface 44 substantially at its center, such a condition being shown in Figure 3. As the mirror approaches and leaves such position, a light beam reflected by it to the camera, will be, due to the different angle of incidence upon the surface of the mirror 41, directed to a point above or below the center of the sensitive surface, and this deflection as represented in Fig. 4, is a function of the time interval (phase shift) of the event from the reference (zero line) time and of the speed of the mirror 41. Hence, the record of the falling body taken with the revolving mirror 41, represents a means of time amplification on it; both the horizontal abscissa, on which the time is measured according to the speed of the mirror and the vertical ordinate on which the time is measured according to the speed of the camera are a measure of the time of passage of the falling body by the observation stations. This provides an accuracy of the order of $10^{-7}$ to $10^{-8}$ in timing the passages.

Fig. 3 is a side view of the revolving mirror 41 and of the camera 43. The travel of the film 44 is parallel to the axis of the revolving mirror 41. However, a device has to be provided so that not all five traces are recorded simultaneously. This is accomplished by means of a pair of revolving shutters 45 and 46. This pair of shutters 45 and 46 is mounted to a common shaft 47 and is so geared to the synchronous motor 42 through gearing indicated generally as enclosed by casing 48, and the openings of the shutters 45 and 46 are so disposed, that only one of the optical systems, 11, 12, 13, 14, 15, 16, 17, 18, 19, and 20 will be projected into the camera 43 at a time. In other words, the shutters are so designed and related as shown in Fig. 5 that first the passage through the station 11 is projected to the revolving mirror 41, then the passage through 12, and successively in progression through apertures 11', 12', 13', 14', 15', in shutter 45, and then through apertures 16', 17', 18', 19', and 20' in shutter 46. Finally, a film record is thus obtained as shown in Fig. 4. The apertures of the shutters should be of sufficient length to allow for any variation in rate of fall of the body within the tube.

First, the record of the first observation station appears; as the openings $C_1$ are illuminated at regular time intervals, these exposures appear one below the other, and are drawn sideways as the film 49 or paper moves at the same time. In each of the circles 50 on the film record appears the shadow of the falling body 2 in its progressive positions with respect to the opening. After the passage through station 11 has been recorded, then follow the passages through stations 11, 12, 13, etc. To facilitate the timing of the passages, cross hairs are provided in the optical systems.

In Figs. 6, 7 and 8 I have shown apparatus for photoelectric recording employing the system of my invention. The construction of the tube 1, of the optical systems $C_1$ and 11–20, inclusive, deflecting prisms 31–40, inclusive, etc., is similar to the arrangement shown in Fig. 2. However, there is now a right angle mirror 51 whose purpose is to deflect the light coming from below and above to an elongated cylindrical lens 52 with its axis arranged parallel to the mirror 51 shown more clearly in Figs. 7 and 8, which lens in turn concentrates it upon the sensitive element of a photoelectric cell 53. From the photoelectric cell 53 connections are taken through leads 54 to a standard photo-cell amplifier which may record the electrical impulses as hereinafter explained by use of a cathode ray oscillograph and revolving mirror, or by the condenser discharge method as a means of measuring short time intervals. A shutter such as used in the form of my invention illustrated in Figs. 2, 3 and 5 may again be provided, but it is not necessary in this case, as the reduction of the photoelectric current by the passage of the falling body may be measured either as portion of the current from all exposures or, with shutter, as a fraction of the current from one exposure.

Fig. 9 shows an embodiment of my invention employing a capacitive recording method. At each of the observation stations, two condenser plates are provided through which the body falls, thereby changing the capacity existing across each set of condenser plates in succession. The condenser plates are preferably formed as portions of a spherical surface. I have shown the sets of plates at 61, 62, 63, 64, 65, 66, 67, 68, 69 and 70. All condensers are connected in parallel and to a voltage source 71 through a resistor 72. Changes in voltages are produced on this resistor 72 as the body passes the stations and are transferred to an amplifier by capacitive coupling as shown at 73. Again, the output of the amplifier is not shown, as it is the same as that shown in Fig. 8, whose function will be explained hereinafter.

I may provide an electromagnetic method of recording as shown in Fig. 10. In this type of arrangement the observation stations are each occupied by solenoids indicated at 81, 82, 83, 84, 85, 86, 87, 88, 89 and 90. To work properly on this arrangement, the falling body should be magnetized, or else, the solenoids must consist of two windings, one provided with direct current intended to magnetize the body as it passes, and the other to pick up the induced current. This last arrangement is not as favorable as it is likely to slow up the movement of the body and produce errors in reading.

The requirement of a magnetic or iron body may be completely avoided by connecting the coils not directly to an amplifier through the transformer 91 as indicated in Fig. 10, but by using the coils as the inductances in an oscillating circuit. This inductance is changed by the falling body regardless of whether it is ferromagnetic or just metallic, and the changes in frequency introduced by each passage of the body is registered as changes in plate current in a coupled electron tube circuit connected with a resonant circuit. Incidentally, the same arrangement may also be used for the capacitive arrangement of Fig. 9, where all the capacities in parallel constitute the capacity of the oscillating circuit. When the body is traversing any of the condensers 61–70, the frequency of the circuit changes, which appears as a recordable change in the plate curent in a coupled electron tube system connected with a resonance circuit.

Instead of employing the method of direct photography illustrated in Figs. 3 and 4 for recording the fall of the body, I may employ electric recording for any of the methods shown in Figs. 6–10. The arrangements shown in Figs. 6–10 have in common the fact that the passage of the body through the observation stations may be recorded electrically. There are, then two methods how the electrical impulses so produced may be utilized for timing the passages.

The first is shown in Fig. 11. The electrical impulses are stepped up by an amplifier 92 whose output 93 is connected to a cathode ray oscillograph indicated at 94. Regardless of whether passage or approach of the body is recorded photoelectrically, capacitively or electromagnetically, in all cases the indication of the cathode ray oscillograph 94 will be the same. That is, the oscillograph 94 will show a rise of current to a peak and then a drop. The rate of rise or drop will be governed by the laws controlling the generation of electricity when the movement of the body is transferred through photo-cell, through condensers, or through the electromagnetic pickup. To provide for a high accuracy in timing this peak, as well as the rise and fall of the current, the cathode ray oscillograph record is not photographed directly but after the light has been reflected from a rotating mirror 95. To better the quality of photography and intermittent illumination of the rotating mirror 95 I provide a rotating segment shutter 96 geared to the revolving mirror through gear system 97 driven from a suitable motor. The position of the falling body is photographed by camera 98 arranged as shown.

The second method of timing the electrical impulses generated when the body passes the stations, is shown schematically in Fig. 12. The two fundamental principles involved are these: (1) The deflection of a ballistic galvanometer is proportional to the quantity of electricity flowing through it; (2) If a condenser is discharged, through a resistor, for a short time interval $t$, then the ratio of the quantity of electricity, $q$, on it after the discharge interval divided by the original quantity before $q_0$, the discharge, is equal to: base of the nat. log. to the minus discharge time divided by resistance times capacity, or $$\frac{q}{q_0} = e^{\frac{-t}{Rc}}$$

Therefore, provision may be made in the amplifier circuit indicated at 99, by the insertion of two grid glow tube relays to discharge a condenser by the electrical impulse generated when the falling body passes through one of the observation stations, and to stop this discharge when the body reaches the next station and generates a corresponding impulse. The amplifier 99 is connected to a ballistic galvanometer 100, the mirror of which reflects light upon the lens 101 of camera 102. Then, if the galvanometer deflections are photographed continuously and there was a reading of $s_0$, before any one discharge took place and another reading $s$ when this discharge was finished on the next passage, the ratio of these two deflections is related to the time interval between passages on two subsequent observation stations by $$t = R.c. \log \text{nat} \frac{s_0}{s}$$

Thus, when the galvanometer is photographed while the body is falling through the tube 1 and generates electrical impulses either by photoelectric, or capacitive, or electromagnetic pickup, the deflections may be utilized to calculate the time passages with an accuracy of about $10^{-8}$ to $10^{-7}$ seconds.

Several methods may be utilized for determining the interval travelled by a falling body in a given time interval or intervals. A scale may be photographed adjacent the path of the falling body with the body at regular intervals so that the position of the moving body with respect to the stationary scale may be observed. This method introduces inaccuracies, as the length measurements must be accurate to one part in a million. Hence, in the system of my invention I employ the capacitive or electromagnetic, or the interferometer method. The capacitive or electromagnetic methods have been explained in connection with the arrangements illustrated in Figs. 9 and 10. The rate of change of the cathode ray oscillograph reading as the falling body approaches or leaves any of the observation stations is proportional to the change in interval with time; therefore, the latter quantity may be calculated from the oscillographic record, particularly, from the amplitudes at given time intervals when the revolving mirror with shutter is used. The same applies to the capacitive type of pickup of the fall motion.

The next accurate and also most delicate of all methods for measuring travel interval, is the interferometric method of measuring traveled path for any constant or variable time interval by use of the arrangement illustrated in Fig. 13. The agate block in the releasing mchanism is shown at 103 having an opening 104 closed by a transparent air-tight window 105 across the end of tube 1 to admit light from the interferometer attachment. The interferometer shown consists of a source of monochromatic light 106 in the focus of the lens 107. Thence the light goes to the plane-parallel glass plate 108 and is reflected from its front, passes through the compensator plate 109, and is thrown into the fall tube where it hits the falling body 2. In this arrangement, the surface of the body 2 is, of course, highly polished. The reflected light passes then through the compensator plate 109 again, and goes straight through the plane-parallel glass plate 108. Beyond plate 108 the light interferes with the other part of the light from the source 106 which has gone straight through the plate 108 to the mirror 110, and which has been reflected from mirror 110 as well as from the plate 108 into the telescope 111. When there is a difference of one-half wavelength in the light paths, i. e., in the light reflected from the mirror 110 and in the light reflected from the surface of the falling body 2, there will be darkness in the telescope 111. Furthermore, as the body 2 falls, the field of the telescope 111 will change rapidly from dark to light and vice versa as the distance of the falling body changes by one-quarter wavelength. The object of the arrangement is then, to measure the number of changes from dark to light and back to dark again in a given or arbitrary time interval. This may be done most conveniently by the use of the revolving mirror indicated at 112. In this arrangement the change from dark to light acts as intermittent illumination and a type record much similar to that shown in Fig. 4 is obtained,—except that the time intervals between subsequent exposures are no longer constant, as the distance of the changes from dark to light and vice versa, is given by the equation hereinbefore referred to as $s = \frac{1}{2}gt^2$. The light from telescope 111 is directed by means of prisms 113 and 114 upon revolving mirror 112. Mirror 112 is rotated by a suitable motor illustrated at 115. The photographic record is made by means of camera 116.

An alternative arrangement of this arrangement resides in not to pick up the changes in the field of the telescope 111 by a revolving mirror, but by a photoelectric cell and to record the changes from dark to light by means of a cathode ray oscillograph, after they have been stepped up by an amplifier, in much the same manner as shown in Fig. 11.

The method of time marking in all arrangements which I have described consist of time marking by controlling the interval of illumination or separate time marking. The oscillator shown in Fig. 2 may be controlled by a quartz crystal, which will render the periodic operation of the circuit very accurate in the arrangements shown in Figs. 2 and 6. In the cathode ray recording methods as shown in Fig. 11 as it applies to the method of Figs. 6, 9, and 10, the shutter interval may be controlled in the same manner from a quartz-crystal governed oscillator, thereby obtaining a high degree of precision in operation. Separate time marking may be employed by transferring the oscillations of a quartz controlled oscillator to a cathode ray tube and the oscillogram photographed on the same film together with the other phenomena. The vibrating quartz may be photographed directly, or else a controlled oscillator may be used to drive a vibrating reed, which may be photographed on the film for comparison with the characteristics of the record produced by the falling body.

While I have described several preferred embodiments of my invention, I realize that many modifications of my invention may be made and that the forms herein disclosed have been shown for illustrative purposes. Accordingly, I do not limit my invention to the embodiments shown but intend to include within the scope of my invention all embodiments embraced by the following claims.

What I claim as new and desire to secure by Letters Patent of the United States is as follows:

1. In an instrument for measuring gravity, a normally vertically positioned tube reversible in positions about a horizontal axis, a fall body within the tube, a device in each end of the tube for releasably holding the fall body at the uppermost end of the tube, and for arresting the falling movement of the body at the lower end of the tube, means for operating the devices to release the body at the upper end, and to hold the body at the lower end after its motion has been arrested and during reversal of the tube position, and means for observing the rate of fall of the body from the upper to the lower end of the tube.

2. In an instrument for measuring gravity, a normally vertically positioned tube reversible in position about a horizontal axis, means for observing the passage of a body along the tube, a fall body of electrical conducting material within the tube, a body of semi-conducting material at each end of the tube, and an electrical circuit at each end of the tube interrupted by the body of semi-conducting material and the fall body when the latter is in contact with the former, whereby the fall body is held against the semi-conducting body by capacitative attraction, each circuit being open when the fall body is spaced from the semi-conducting body of that circuit, and each circuit including a circuit breaker for releasing the fall body from the semi-conducting body.

3. In an instrument for measuring gravity, the combination of a normally vertically positioned tube reversible about a horizontal axis, a device at each end of the tube for receiving and releasably holding a fall body within the tube adjacent the respective ends and means for operating the devices, and stationary means positioned adjacent the tube for observing the fall of a body from the upper to the lower end of the tube.

4. In an instrument for measuring gravity, the combination of a normally vertically positioned tube reversible about a central horizontal axis and having duplicate light-transmitting means on each side of and equally spaced from the axis, a device at each end of the tube for releasably holding a fall body within the tube adjacent the respective ends and means for operating the devices, a light source for directing light upon the fall body within the tube by way of the light transmitting means, and a stationary light reflecting device positioned to receive light from the corresponding light-transmitting means of the respective portions of the tube on the opposite side of the axis to direct light from the light transmitting means to an observation point, whereby the fall of the body may be observed when either end of the tube is uppermost.

5. In an instrument for measuring gravity, the combination with a normally vertically positioned tube reversible about a central horizontal axis and having a plurality of light-transmitting devices equally spaced along its length and on each side of the axis, and a light source for supplying light to the light transmitting devices, of a plurality of stationary mirrors positioned to receive light respectively from the different light-transmitting devices and direct it to a recording device, the mirrors being so spaced as to receive light from corresponding light-transmitting devices on opposite sides of the axis when the tube is reversed, whereby the fall of a body within the tube may be observed when either end of the tube is uppermost, and means for releasably holding a body adjacent either end of the tube.

6. In an instrument for effecting the rapid measurement of gravity, a vertically disposed tube, means for dropping a body whose fall characteristic is to be determined through the tube, means for directing a plurality of beams of light across the tube at intervals spaced along the path of the falling body, a light-sensitive recording device, and mirrors associated with the beams of light emergent from the tube for directing the said beams to the recording device.

7. In an instrument for effecting the rapid measurement of gravity, a vertically disposed tube, means for dropping through the tube a body whose fall characteristic is to be measured, means for directing parallel beams of light across the tube at intervals spaced along the path of the falling body, a light-sensitive recording device, and mirrors associated with the beams of light as they emerge from the tube for changing their direction and directing them to the recording device along different parallel paths.

8. In an instrument for effecting the rapid measurement of gravity, a vertically disposed tube having a device for dropping through it a body whose fall characteristic is to be measured, means for directing a plurality of beams of light across the tube at intervals spaced along the path of the falling body, a light-sensitive recording device located adjacent the vertical center of the tube, and mirrors associated with the different beams of light for directing the said beams along different parallel paths to the centrally located recording device.

9. In an instrument for effecting the rapid measurement of gravity, a vertically disposed tube having a device for dropping through it a body whose fall characteristic is to be measured, means for directing a plurality of parallel beams of light across the tube at intervals spaced along the path of the falling body, a mirror associated with each of the light beams as it emerges from the tube for directing the beams along different parallel paths toward the vertical center of the tube, a rotary mirror disposed in the paths of all of the light beams for changing the paths of the said beams substantially ninety degrees and to a direction away from the tube, a shutter above and a shutter below the rotating mirror for permitting the passage of a single one of the beams at a time, means for driving the shutters and the rotating mirror, and a light-sensitive recording device positioned to receive all of the light beams reflected by the rotating mirror.

10. In an instrument for rapidly measuring gravity, a vertically disposed tube having a vertically central horizontally pivoted mounting and a device at each end for dropping through it a body whose fall characteristic is to be measured, illuminating means upon one side of the tube for directing a plurality of beams of light across the tube at points spaced equally above and below the pivoted mounting, a light-sensitive recording device positioned adjacent the central point of the tube, and a plurality of mirrors upon the side of the tube opposite to the illuminating means, the said mirrors being arranged to direct the respective beams of light to the recording device.

CARL A. HEILAND.